US011945693B2

(12) United States Patent
Sexton et al.

(10) Patent No.: US 11,945,693 B2
(45) Date of Patent: Apr. 2, 2024

(54) MULTI-FUNCTIONAL CLAMP, SYSTEM AND METHOD FOR THE INSTALLATION OF A WIND TURBINE ON AN OFFSHORE SUBSTRUCTURE

(71) Applicant: SAIPEM S.P.A., Milan (IT)

(72) Inventors: Christopher Sexton, Milan (IT); Benjamin Stokes, Milan (IT); Vincent McCarthy, Milan (IT)

(73) Assignee: SAIPEM S.P.A., Milan (IT)

( * ) Notice: Subject to any disclaimer, the term of this patent is extended or adjusted under 35 U.S.C. 154(b) by 306 days.

(21) Appl. No.: 17/423,047

(22) PCT Filed: Jan. 17, 2020

(86) PCT No.: PCT/IB2020/050378
§ 371 (c)(1),
(2) Date: Jul. 14, 2021

(87) PCT Pub. No.: WO2020/148719
PCT Pub. Date: Jul. 23, 2020

(65) Prior Publication Data
US 2022/0063963 A1 Mar. 3, 2022

(30) Foreign Application Priority Data

Jan. 17, 2019 (EP) ..................... 19152411

(51) Int. Cl.
*B66C 1/10* (2006.01)
*F03D 13/10* (2016.01)
*F03D 13/25* (2016.01)
(52) U.S. Cl.
CPC .............. *B66C 1/108* (2013.01); *F03D 13/10* (2016.05); *F03D 13/25* (2016.05); *F05B 2230/6102* (2013.01)

(58) Field of Classification Search
CPC ......... B66C 1/108; F03D 13/10; F03D 13/25; F03D 13/22; F03D 13/20;
(Continued)

(56) References Cited

U.S. PATENT DOCUMENTS 5,722,796 A * 3/1998 Halvorsen ............... E21B 41/08
166/341
8,016,519 B2 * 9/2011 Bingham ................ B66C 23/52
405/209
(Continued)

FOREIGN PATENT DOCUMENTS

CN 201176357 Y 1/2009
CN 101 468 774 7/2009
(Continued)

OTHER PUBLICATIONS

Communication pursuant to Rule 114(2) EPC for Application No. 19152411.5 enclosing Third Party Observation of Application No. EP20190152411 dated Aug. 24, 2021 (15 pages).
(Continued)

*Primary Examiner* — Gregory W Adams
(74) *Attorney, Agent, or Firm* — Neal, Gerber & Eisenberg LLP (57) ABSTRACT

A multi-functional clamp for the installation of a wind turbine on an offshore substructure by a crane vessel equipped with a lifting crane, the multi-functional clamp having: a main body configured to selectively clamp and unclamp the lower part of the tower of a wind turbine and is shaped so as to couple with the crane vessel so as to define a given position for the tower with respect to the crane vessel; and a plurality of hooking members extending from the main body and configured to secure and release the free
(Continued)

ends of a rigging assembly of the lifting crane to the main body so as to lift the multi-functional clamp by the lifting crane.

24 Claims, 9 Drawing Sheets

(58) Field of Classification Search
CPC ........... F05B 2230/6102; Y02E 10/727; Y02E 10/728; E02B 2017/0091; E02B 2017/0039; E02B 2017/0043; E02B 2017/0065
USPC ...................... 405/227, 228; 52/122.1, 123.1
See application file for complete search history.

(56) References Cited

U.S. PATENT DOCUMENTS

| | | | | |
|---|---|---|---|---|
| 8,701,579 B2* | 4/2014 | Roodenburg | ........... | B63B 1/107 405/209 |
| 8,939,299 B2* | 1/2015 | Ahler | .................... | B66C 23/207 212/270 |
| 9,222,233 B2* | 12/2015 | Peters | ...................... | E02D 7/16 |
| 2008/0237173 A1 | 10/2008 | Altman et al. | | |
| 2011/0168654 A1 | 7/2011 | Ahler et al. | | |
| 2012/0076630 A1* | 3/2012 | Tehrani | .................... | F03D 13/10 414/816 |
| 2012/0195768 A1 | 8/2012 | Van Nood et al. | | |
| 2013/0051924 A1* | 2/2013 | Willis | ..................... | F03D 13/10 414/803 |

FOREIGN PATENT DOCUMENTS

| | | | | | |
|---|---|---|---|---|---|
| CN | 101468774 A | * | 7/2009 | ............. | B66C 1/108 |
| CN | 102139829 A | | 8/2011 | | |
| CN | 102616643 A | * | 8/2012 | ............. | E02D 13/04 |
| CN | 102616643 A | | 8/2012 | | |
| CN | 105 460 796 | | 4/2016 | | |
| EP | 2 219 986 | | 8/2010 | | |
| EP | 2 275 340 | | 1/2011 | | |
| EP | 2 327 874 | | 6/2011 | | |
| EP | 2 641 825 | | 9/2013 | | |
| EP | 2886722 A1 | * | 6/2015 | ............. | E02D 13/04 |
| GB | 2 423 108 | | 8/2006 | | |
| JP | 2011112045 | | 6/2011 | | |
| JP | 2016173096 | | 9/2016 | | |
| JP | 2017002751 | | 1/2017 | | |
| WO | WO 2007/091042 A1 | | 8/2007 | | |
| WO | WO 2010/023743 | | 3/2010 | | |
| WO | WO 2010/147480 | | 12/2010 | | |
| WO | WO 2018/139918 | | 8/2018 | | |
| WO | WO 2018/234337 | | 12/2018 | | |

OTHER PUBLICATIONS

Frame from youtube video found under https://www.youtube.com/watch?v=PmkA6hbJj8, dated 2017 (1 page).
Photograph showing the cables being attached to the Turbine Interface Frame from article found under https://www.maritimejournal.com/news 101/marine-renewable-energy/bowtis_takes_offshore_wind_deeper, dated Jan. 12, 2006 (3 pages).
Third Party Observation Arguments for Application No. EP20190152411 dated Aug. 17, 2021 (14 pages).
Notification Concerning Submission, Obtention or Transmittal of Priority Document for International Application No. PCT/IB2020/050378 dated Mar. 30, 2020.
International Search Report and Written Opinion for International Application No. PCT/IB2020/050378 dated May 27, 2020.
Japanese Office Action for Application No. 2021-540438 with translation dated Aug. 25, 2023 (6 pages).

* cited by examiner

MULTI-FUNCTIONAL CLAMP, SYSTEM AND METHOD FOR THE INSTALLATION OF A WIND TURBINE ON AN OFFSHORE SUBSTRUCTURE

PRIORITY CLAIM

This application is a national stage application of PCT/M2020/050378, filed on Jan. 17, 2020, which claims the benefit of and priority to EP Patent Application No. 19152411.5, filed on Jan. 17, 2019, the entire contents of which are each incorporated by reference herein.

TECHNICAL FIELD

The present disclosure relates to a multi-functional clamp for the installation of a wind turbine on an offshore substructure.

The present disclosure also relates to a system and method of making use of the multi-functional clamp for the installation of a wind turbine on an offshore substructure.

For the purpose of the present disclosure, the definition "wind turbine" identifies a wind turbine including a tower; a nacelle mounted atop the tower; and a rotor fitted to the nacelle including a hub and a complete set of blades.

The definition "tower" identifies an elongated vertical structure; the definition "nacelle" identifies a structure housing an electric generator and configured to be mounted atop the tower in a rotatable manner about the axis of the tower. The definition "rotor" identifies an assembly comprising a hub to be fitted in rotatable manner to the nacelle. The definition "offshore substructure" identifies support structure and foundations to transfer loads to the bed of a body of water.

BACKGROUND

The current trend regarding the offshore wind turbine continues to look at increasing the electric power output of wind turbine and calls for increasing the size of the wind turbines. The so-called high-power wind turbines currently under test may reach the size of the rotor diameter of 240 meters.

Offshore wind farms requires transporting the wind turbines to installation sites by vessels and installing them on respective offshore substructures. These operations are relatively complex and the relative complexity increases with the size of the wind turbines.

One issue concerns how many of the components of the wind turbine could be preassembled at the onshore yard/port and how many components could be assembled at the offshore site.

Since the installation sites for the high-power wind turbines are normally located in open seas, relatively high specification requirement vessels are required for the transportation so that the daily rates could be rather relatively high.

Various patent literature contain disclosures affording the main issues concerning the installation of offshore wind turbines.

For example, EP Patent No. 2,275,340 A2 discloses an installation jack-up vessel provided with a cantilever mast used to transfer of wind turbine components from the deck of the jack-up vessel to an offshore installation site and guide the transfer to prevent undesired swinging movements of the wind turbine components.

In another embodiment, a main crane is used in cooperation with a guide arm to transfer and guide wind turbine components from the jack-up vessel to the offshore installation site.

In another embodiment, several complete assembled wind turbines are transferred from the jack-up vessel to the installation site.

U.S. Published Patent Application No. 2012/195,768 A1 discloses transferring blades from onshore to a jack up vessel, assembling the two upper blades by using holding and assembly frame, assembling a third blade and lifting the nacelle together with the complete rotor above the tower, and mounting the nacelle atop the tower.

While the site of installation is in relatively deeper water, the installation jack-up vessel is replaced by DP-controlled vessel.

EP Patent No. 2,219,986 B1 discloses an installation method comprising: carrying on the deck of the DP-controlled vessel a tower with a single blade attached to it and lying on the deck in a horizontal configuration, the nacelle, and the rotor fitted to the nacelle and including the hub and two blades in a bunny ear configuration; raising the tower together with the blade attached to it in a vertical configuration; placing the tower and said blade on an offshore substructure; and lifting the nacelle and the rotor above the tower and coupling the nacelle atop the tower.

GB Patent No. 2,423,108 discloses installing a wind turbine by means of a vessel in an offshore substructure provided with a foundation in the bottom of the body of water and a socket for housing the wind turbine. The vessel is configured to transfer the wind turbine in a reclined position on the deck of the vessel and comprises an A-frame operated by winches to erect the wind turbine above the substructure and nest the wind turbine in the socket.

In general, the installation of wind turbines in an offshore site has to face several problems deriving from the delicate structures of some components such as the blades that are usually made of glass-fiber, and the shape and the size of the wind turbines that are steadily increasing through time.

Certain of the above problems are even more emphasized when the installation site is in relatively deep water and waves and wind hamper the in situ assembly and any other maneuver concerning the installation of a wind turbine.

Assembling high-power wind turbine in relatively deep water has to face the additional problem of keeping the tower in a given upright position close the offshore substructure and then safely transferring the wind turbine from this position to the offshore substructure.

SUMMARY

One object of the present disclosure is to provide a multi-functional clamp for the installation of a wind turbine on an offshore substructure in a relatively safe and straightforward manner even in relatively deep water.

According to the present disclosure there is provided a multi-functional clamp for the installation of a wind turbine on an offshore substructure by a crane vessel comprising a lifting crane, the multi-functional clamp comprising: a main body configured to selectively clamp and unclamp the tower of a wind turbine and is shaped so as to couple with the crane vessel so as to define a given or designated position for the tower with respect to the crane vessel; and a plurality of hooking members extending from the main body and configured to secure and release the free ends of a rigging assembly of the lifting crane to the main body so as to lift the multi-functional clamp by the lifting crane. In this way, the multi-functional clamp has the functions of keeping the tower in upright position with respect to the crane vessel, allowing or enabling a relatively safe assembly of the wind turbine, lifting and lowering the wind turbine for installation of the wind turbine on the offshore substructure.

In particular, the multi-functional clamp comprises a plurality of jaws, which extend inwardly from the main body and are configured to selectively clamp and unclamp the tower, and a plurality of first actuators for controlling the jaws. In this way, the clamping and unclamping of the multi-functional clamp is performed by actuators that can be remotely controlled.

In particular, each hooking member comprises two flanges having respective aligned holes and a pin configured to insert in both holes, and a second actuator mounted on one of said flanges. In this way the connection, with rigging assembly can be controlled from a remote position.

In particular, the main body is annular and is openable in an open configuration and closable in a close configuration, such as by third actuators. In this way, the tower can be relatively easily inserted inside the clamp.

In particular, the main body comprises a first, a second and third sector, the second and third sector comprising respective first ends hinged to the opposite ends of the first sector, and respective second ends, which are mutually and selectively lockable to each other. In this way, the clamp can relatively safely retain the relative high load of the wind turbine.

In particular, the first sector comprises there parallel holes to couple with the crane vessel so as to define a given or designated position for multifunctional clamp with respect to the crane vessel. In this way, while the first sector define a given or designated position for the multi-functional clamp, the second and the third sector can open and close.

Another object of the present disclosure is to configure a system for the installation of a wind turbine on an offshore substructure in a relative safe and straightforward manner even in relative deep water.

According to the present disclosure, there is provided a system for installation of a wind turbine on an offshore substructure, wherein the wind turbine comprises a tower; a subassembly comprising a nacelle and a hub; and a number of blades; the system comprising: a crane vessel comprising a main deck and at least one lifting crane; a multi-functional clamp as disclosed in the present disclosure; and a deck extension module, which is mounted to the crane vessel and is configured to couple with the multi-functional clamp and support a tower. In this way, the deck extension module can be arranged in a relatively favorable position for the operations of the lifting crane and for transferring the wind turbine from the crane vessel to the offshore substructure and the main deck of the crane vessel is free for storing the wind turbine components.

In particular, the deck extension module comprises a lower deck including a pit for constraining and supporting the bottom end of the tower. In this way, the lifting crane can lower the tower into the pit and lift the wind turbine off the pit In particular, the deck extension module comprises an upper deck configured to shape couple with the multi-functional clamp in order to hold the multi-functional clamp aligned with the pit. In this way, the position the multi-functional clamp is defined along the upper deck and the tower is constrained by the pit and by the multi-functional clamp in mutual alignment. In other words, the upper deck and the multi-functional clamp comprises a plurality of recesses and protrusions for mutual coupling to define a position of the multi-functional clamp on the upper deck along a given or designated axis. In this way, the position of the tower is well defined with respect to the lifting crane.

In particular, the system comprises a stability frame configured to selectively clamp and unclamp the upper portion of the tower.

The stability frame is necessary when the wind turbine is lifted off the pit by the multi-functional clamp clamped to the lower part of the tower and below the center of gravity of the wind turbine.

During the assembly of the wind turbine is a rest position and the deck extension module comprises a top structure configured to support the stability frame in the rest position.

In particular, the lifting crane comprises a rigging assembly comprising hoisting lines to be secured to the multi-functional clamp and coupled to the stability frame for lifting the wind turbine. In this way, the wind turbine is not directly connected to the rigging assembly of the lifting crane and can be released, when installed on the offshore substructure by unclamping and opening the multi-functional clamp.

Another object of the present disclosure is to provide a method for the installation of a wind turbine on an offshore substructure in a safe and straightforward manner even in deep water.

According to the present disclosure, there is provided a method for installation of a wind turbine on an offshore substructure, the method comprising: clamping a tower of a wind turbine in upright position by a multi-functional clamp as disclosed in the present disclosure; assembling the wind turbine by a lifting crane of the crane vessel, while the multi-functional clamp retains the tower in upright position; lifting the wind turbine by anchoring a rigging assembly of the lifting crane to the multi-functional clamp; and lowering the wind turbine on the offshore substructure.

The method of the present disclosure puts in evidence the function of the multi-functional clamp of retaining the tower in a given or designated position with respect to the crane vessel during the assembly of the wind turbine and the function of transferring the wind turbine from the crane vessel to the offshore substructure.

In particular, the method comprises constraining parts of the rigging assembly into guides of a stability frame clamped to the upper part of the tower. In this way, even though the multi-functional clamp is clamped to the lower part of the tower and below the center of gravity of the wind turbine, when the crane lift the wind turbine by rigging assembly secured to the multi-functional clamp, the load is stable and under control.

In particular, constraining parts of the rigging assembly into guides of a stability frame clamped to the upper part of the tower comprises: controlling a first rigging of the rigging assembly by a first lifting crane of the crane vessel so as to insert parts of the first rigging into the guides of the stability frame from a first side of the stability frame; and controlling a second rigging by a second lifting crane of the crane vessel so as to insert parts of the second rigging into the guides of the stability frame from a second side of the stability frame. In this way, the insertion of the rigging assembly into the guides is relatively simpler.

In particular, the method comprises arranging a tower of a wind turbine on a deck extension module mounted to the crane vessel. In this way, the main deck of the crane vessel is free for storing wind turbine's components.

In particular, the method comprises: arranging the tower in a pit on a lower deck of the deck extension module by the lifting crane of the crane vessel; and clamping the tower by the multi-functional clamp retained in alignment with the pit on an upper deck of the deck extension module. In this way, a passive and positive constrains are applied to the tower at different position along the tower.

In particular, the method comprises selectively coupling the multi-functional clamp to the upper deck by cooperating means defining a given or designated position for the multi-functional clamp along the upper deck. In this way, the multi-functional clamp has a given or designated position along the deck and is stabilized by its own weight.

In particular, the method comprises supplying power to the multi-functional clamp, and exchanging signal between the crane vessel and the multi-functional clamp by an umbilical connected to the multi-functional clamp and the crane vessel. In this way, it is possible controlling the multi-functional clamp from a remote position.

In particular, the method comprises controlling the position of the multi-functional clamp, when suspended to the lifting crane, by tugger lines controlled from the crane vessel.

Tugger lines are controlled by winches located on the crane vessel, and limit possible swinging of the load.

In particular, the method comprises controlling the position of one blade suspended to the lifting crane by further tugger lines and a blade stability frame mounted on the lifting crane.

The blade stability frame allows or enables an improved control of the position of the blade by guiding the tugger lines in close proximity of the blade.

In particular, the method comprises selectively extending the blade stability frame in operative configuration and retracting the blade stability frame in a rest configuration. In this way, the blade stability frame can be retracted in the rest configuration, when the crane is involved in operations other than mounting the blades.

In particular, assembling the wind turbine by a lifting crane of the crane vessel, while the multi-functional clamp retains the tower in upright position further comprises: lifting one subassembly comprising a nacelle and hub on top of the tower for the mounting of the subassembly atop the tower; lifting one blade in horizontal position to the hub for the mounting of the blade to the hub; and repeating the previous step for mounting all the blades of the wind turbine to the hub. In this way, the transport of the components is optimized.

In particular, the method comprises storing a plurality of towers, a plurality of subassemblies, and a plurality of blades on a main deck of the crane vessel.

Therefore, the assembly operation of the crane vessel are not discontinued for long periods.

In particular, the method comprises transporting the plurality of towers, the plurality of subassemblies, and the plurality of blades from an onshore construction site to the crane vessel by a transfer vessel; and transferring the plurality of towers, the plurality of subassemblies, and the plurality of blades from the transfer vessel to the main deck by one lifting crane of the crane vessel. In this way, the crane vessel can stay in deep water and the supply of the wind turbines can be performed by at least one carried vessel.

BRIEF DESCRIPTION OF THE DRAWINGS

A non-limiting embodiment of the present disclosure will be described by way of example with reference to the accompanying drawings, in which.

DETAILED DESCRIPTION

Figure 1:
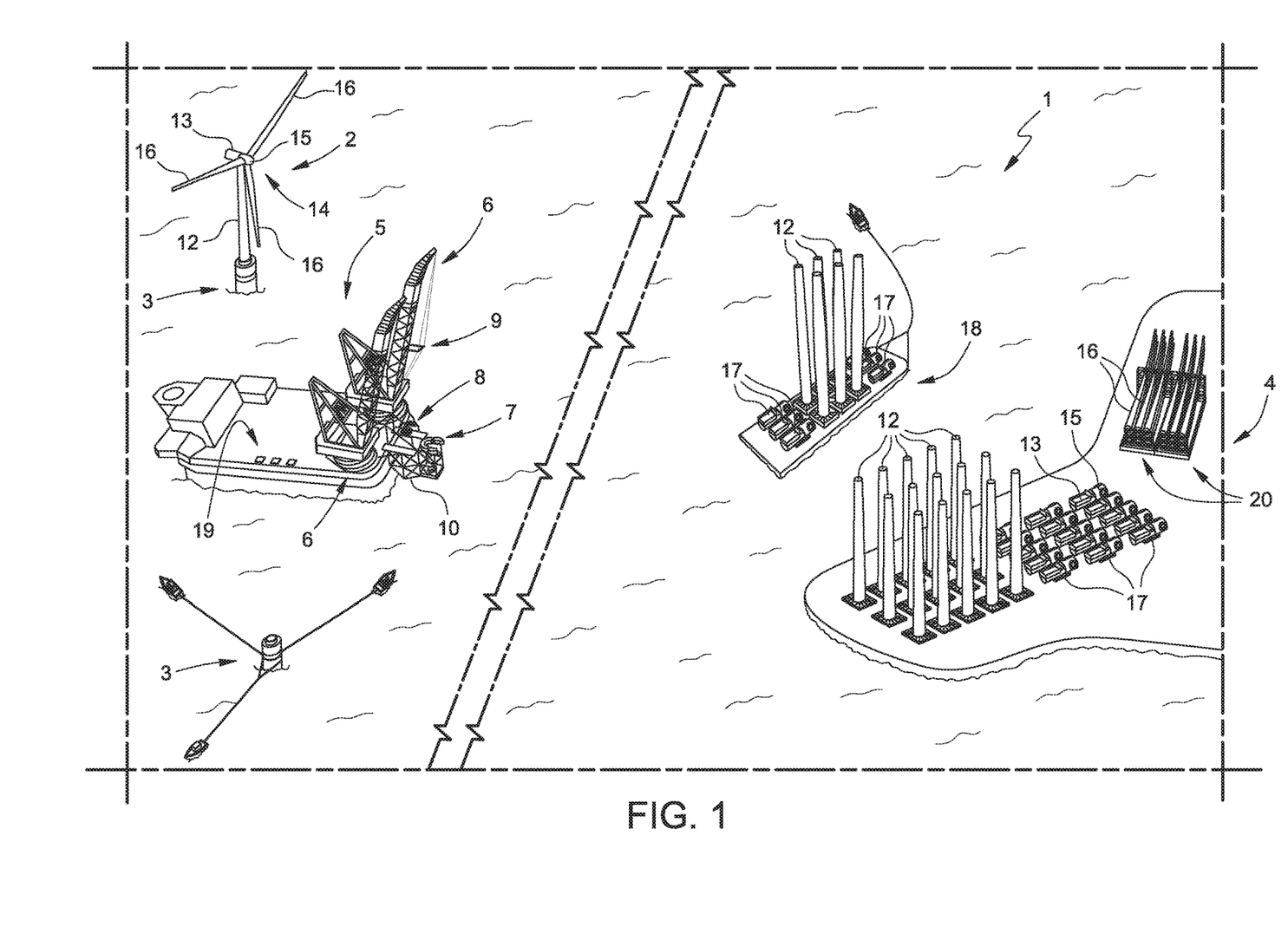
FIG. 1 is a perspective view, with parts removed for clarity, of a system for the installation of wind turbines on offshore substructures in accordance to the present disclosure.

Number 1 in FIG. 1 indicates a system configured to install wind turbines 2 on offshore substructures 3.

According to the present disclosure, the installation of wind turbines 2 includes:
transferring components of wind turbines 2 from an onshore construction site 4 to an offshore site;
assembling the wind turbines 2 by a crane vessel 5; and
installing the wind turbines 2 on respective offshore substructures 3 by the crane vessel 5.

The system 1 comprises:
the crane vessel 5, which, in the accompanying figures, is a "dual crane vessel" provided with two lifting cranes 6 operating side by side, such as, for example, the dual crane vessel known as the "SAIPEM 7000";
a multi-functional clamp 7 configured to grip the wind turbines 2;
a stability frame 8 configured to assist the crane vessel 5 to relatively safely transferring the wind turbines 2;
a blade stability frame 9 configured to assist the assembly of the wind turbines 2;
a deck extension module 10 configured to assemble the wind turbines 2; and
a rigging assembly 11 (FIG. 6) operated by the crane vessel 5 and configured to cooperate with the stability frame 8 and the multi-functional clamp 7 to lift the wind turbine 2.

The wind turbine 2 comprises a tower 12 extending along a longitudinal axis A1; a nacelle 13 rotatably mounted atop the tower 12; and a rotor 14 rotatably mounted to the nacelle 13. The rotor 14 further comprising a hub 15 and blades 16 radially extending from the hub 15.

According to the present disclosure, the onshore construction site 4 delivers towers 12, blades 16 and subassemblies 17 including, each, one nacelle 13 and one hub 15.

A number of towers 12, blades 16 and subassemblies 17 is supplied to the crane vessel 5 by a carrier vessel 18.

The crane vessel 5 comprises a main deck 19 configured to temporarily store a number of towers 12, blades 16 and subassemblies 17, which are transferred from the transfer vessel 18 on the main deck 19 by one lifting crane 6.

Blades 16 are located in a blade rack 20 for relative safe support and transport.

Each wind turbine 2 is assembled on the crane vessel 5 and, in particular, on the deck extension module 10, which is mounted on the crane vessel 5.

Figure 2:
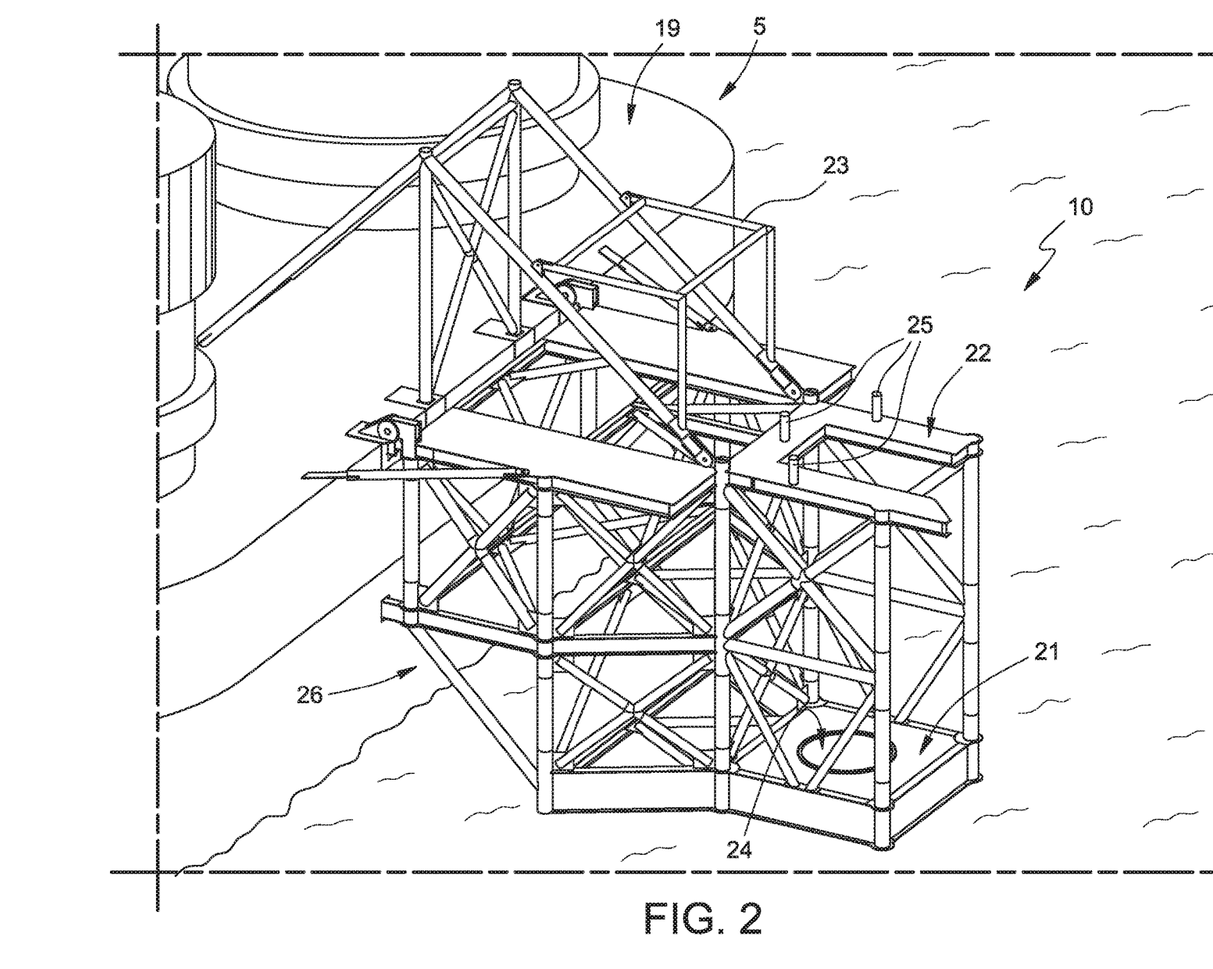
FIGS. 2 and 3 are perspective view, with parts removed for clarity, of details of the system according to the present disclosure.
Figure 3:
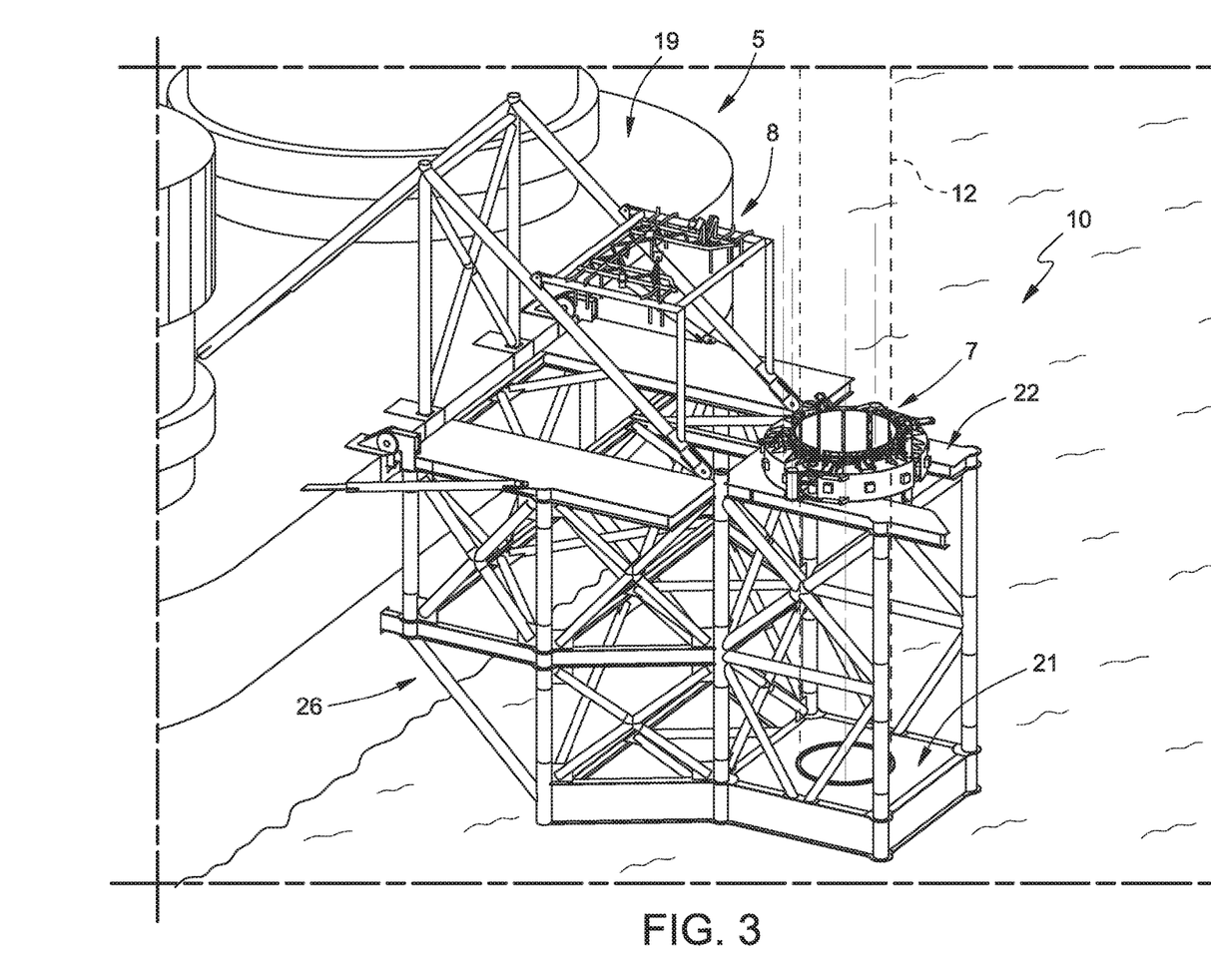

With reference to FIGS. 2 and 3, the deck extension module 10 comprises a lower deck 21 defining a passive constraint for a tower 12 (FIG. 3) in an upright position; and an upper deck 22 configured to host the multi-functional clamp 7, which defines an active constraint for the same tower 12 (FIG. 3).

The deck extension module 10 comprises a top structure 23 elevated from the upper deck 22 configured to support the stability frame 8 (FIG. 3).

The lower deck 21 comprises a pit 24, which is sized to constrain the bottom end of the tower 12 (FIG. 3).

The upper deck 22 is U-shaped and comprises protrusions 25 (FIG. 2) for cooperation with the multi-functional clamp 7 (FIG. 3) so as to locate the multi-functional clamp 7 in a given or designated position.

The deck extension module 10 comprises a lattice structure 26 configured to support the lower deck 21, the upper deck 22 and the top structure 23 for releasable connection with the crane vessel 5.

In the example shown, the upper deck 22 is the same level the main deck 19.

Figure 4:
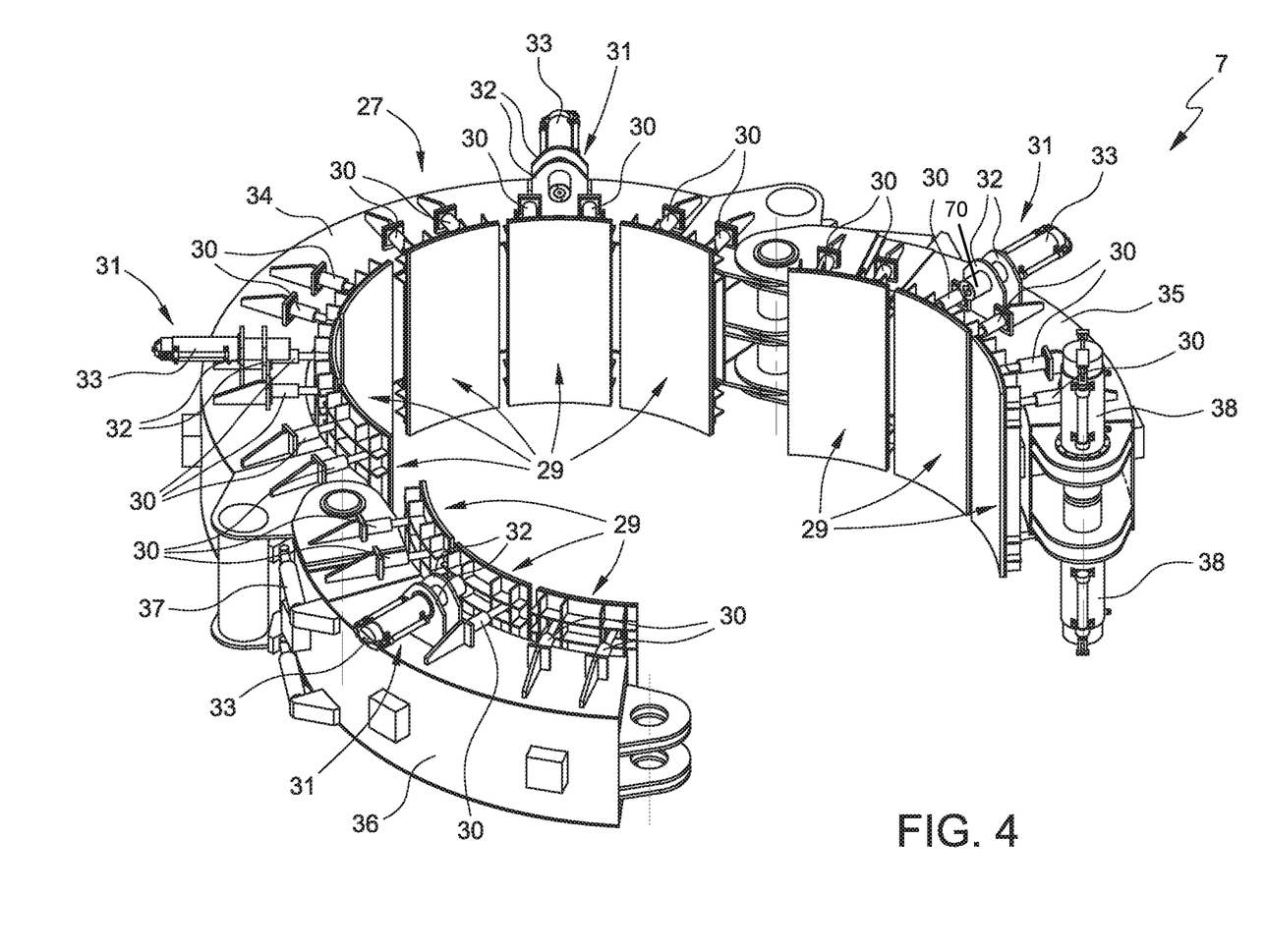
FIG. 4 is a perspective view from above, with parts removed for clarity, of a multi-functional clamp according to the present disclosure.
Figure 5:
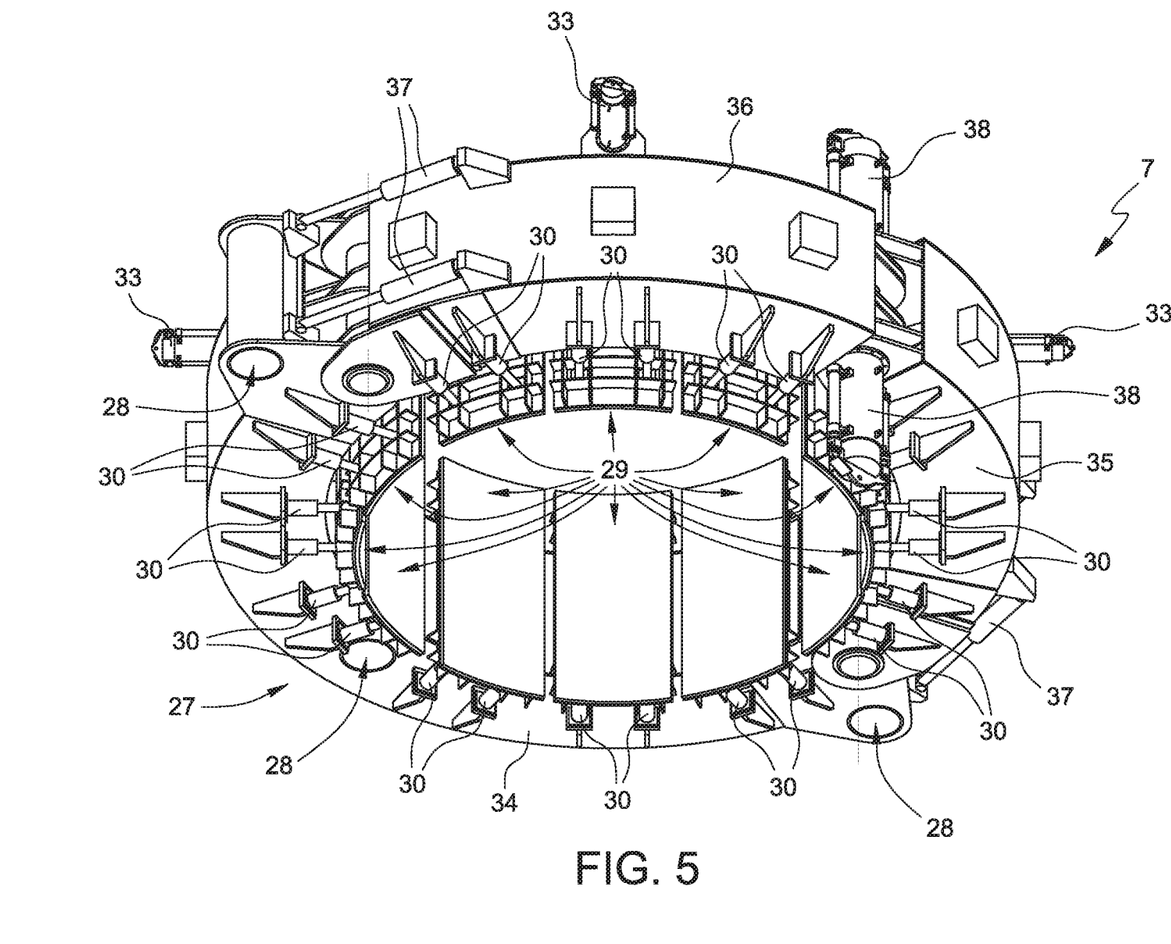
FIG. 5 is a perspective view from below, with parts removed for clarity, of the multi-functional clamp of FIG. 5.

With reference to FIGS. 4 and 5, the multi-functional clamp 7 comprises a main body 27, which is configured to be arranged about the lower part of the tower 12 and is shaped so as to shape-couple with protrusions 25 (FIG. 2) of the deck extension module 10 and so as to constrain the multi-functional clamp 7 along the upper deck 22.

In particular, the protrusion 25 (FIG. 2) are cylindrical and the main body 27 is provided with recesses, in particular holes 28 (FIG. 5), more in particular blind holes, configured to house the protrusions 25 so as to constrain the movement of the multi-functional clamp 7 transversely to the upper deck 22 and allowing or enabling free movement perpendicularly to the upper deck 22.

The multi-functional clamp 7 comprises a plurality of jaws 29, which extend inwardly from the main body 27 and are moveable between extended positions and retracted positions for respectively clamping and releasing the tower 12; and actuators 30 configured to control jaws 28.

Figure 6:
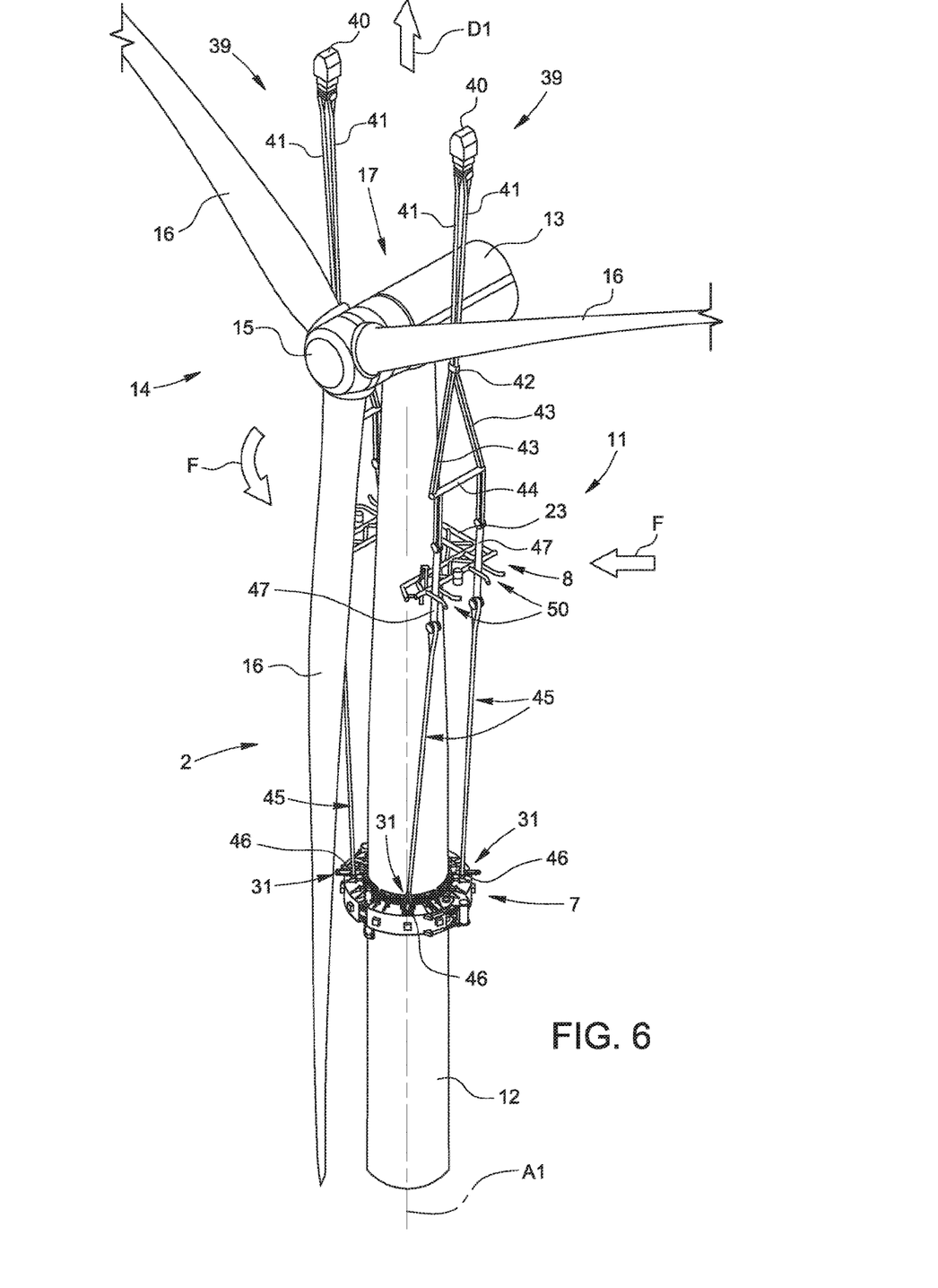
FIG. 6 is a perspective view, with parts removed for clarity, of a detail of the system according to the present disclosure.

With reference to the FIG. 4, the multi-functional clamp 7 comprises a plurality of hooking members 31 extending from the main body 27 and configured to secure the ends of the rigging assembly 11 of a crane 6 to the multi-functional clamp 7 (FIG. 6). Each hooking member 31 comprises two flanges 32 having respective aligned holes; and a pin 70 configured to insert in both holes, and controlled by an actuator 33 mounted on one of said flanges 28.

The main body 27 is annular, openable in an open configuration (FIG. 4), and closable in a close configuration (FIG. 5).

The main body 27 comprises three sector 34, 35, and 36, wherein sectors 35 and 36 are hinged to sector 34 on the opposite sides of the latter and are connectable to each other in a close position.

The multi-functional clamp 7 comprises actuators 37 configured to control the position of sectors 35 and 36 with respect to sector 34, and actuators 38 to lock sectors 35 and 36 in the closed position by latching them one another.

With reference to FIG. 6, the rigging assembly 11 comprises two riggings 39 each one operated by a respective lifting crane 6 (FIG. 1). Each rigging 39 comprises one upper block 40 for connection to lifting crane 6 (FIG. 1); a double sling 41; a further block 42; two slings 43 for connections of block 42 to a spreader bar 44; and two hoisting lines 45.

Each hoisting line 45 is suspended to the spreader bar 44 and has eyelets 46 at its distal ends to be anchored to respective hooking member 31 of the multi-functional clamp 7.

Each hoisting line 45 comprises an elongated flexible rope and an intermediate rigid section 47, which is a bar or a tube, is connected to rope, and is configured to cooperate, in use, with the stability frame 8. Namely, the rigid sections 47 are inserted into the stability frame 8, when in use, by rotation of lifting cranes 6 (FIG. 1) according to arrows F.

Figure 7:
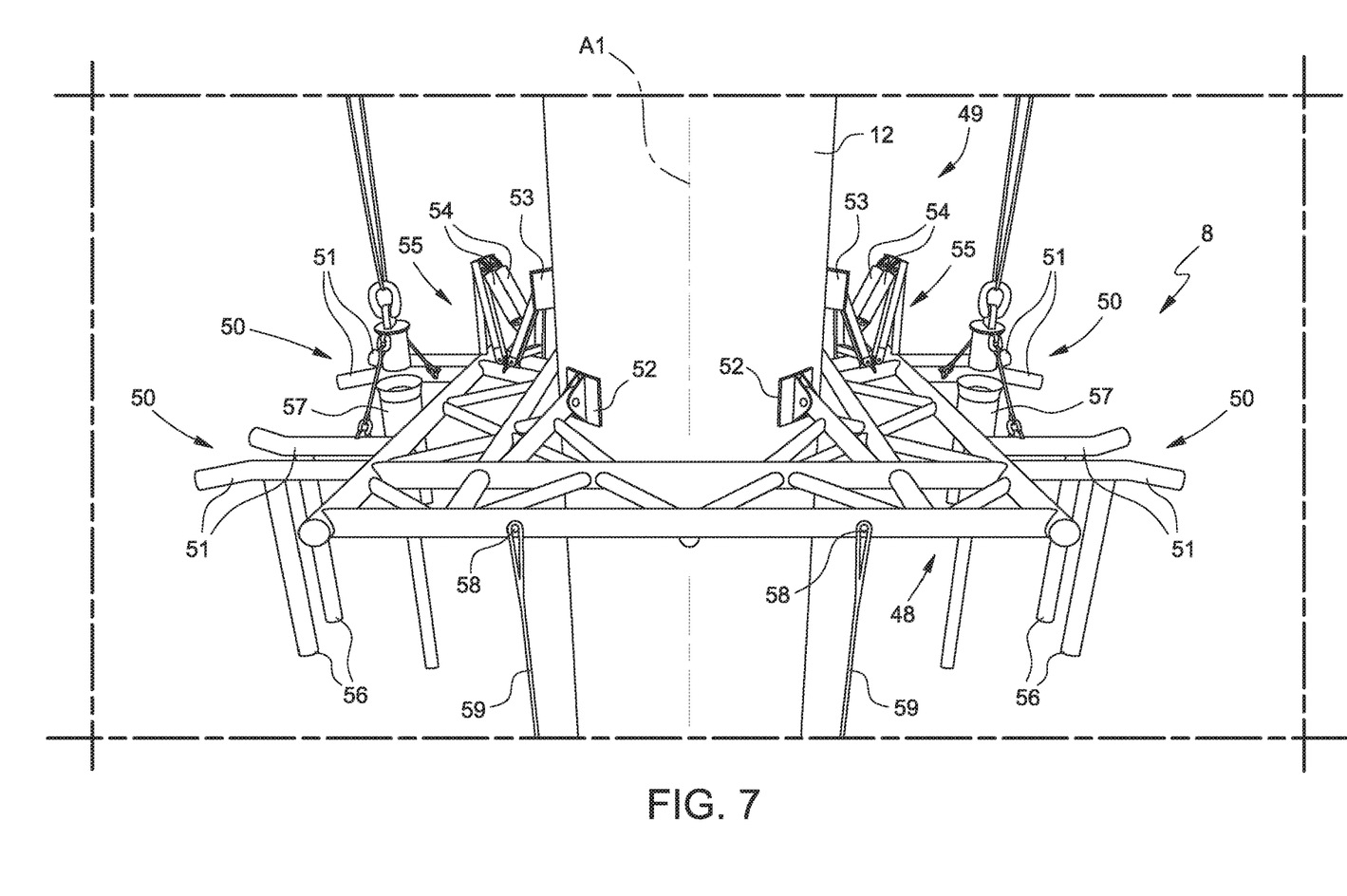
FIG. 7 is a perspective view, with parts removed for clarity and in enlarged view, of a detail of FIG. 6.

With reference to FIG. 7, the stability frame 8 comprises a U-shaped main body 48 configured to be mounted, in use, about the tower 12; a clamp assembly 49 mounted on the main body 48 configured to selectively anchor and release the main body 48 about the tower 12 of the wind turbine 2.

The stability frame 8 comprises a plurality of guides 50, which extend outwardly from the main body 48 and are configured to guide and house parts of the riggings 39, in particular, the rigid sections 47 of the riggings 39 (FIG. 6).

Each guide 50 comprises two bars 51 provided with flared free ends to facilitate the insertion of the riggings 39 (FIG. 2) into the guides 50. In the example shown, the stability frame 8 comprises four guides 50 arranged two by two along opposite sides of the main body 48.

The clamp assembly 49 comprises two idle jaws 52, which are mounted to the main body 48 and extends inwardly from the main body 48, and two actuated jaws 53, which are configured to be actuated between retracted positions and inwardly projecting positions towards the idle jaws 52 by actuators 54.

According to an alternative embodiment, one idle jaw is sufficient to anchor the stability frame 8 to the tower 12.

In the embodiments shown, the stability frame 8 comprises two actuators 54 for each actuated jaw 53.

These actuators 54 of each actuated jaw 53 are operated in parallel and are designed or configured to operate singly in case of failure of one of said two actuators 54.

Each actuated jaw 53 is articulated to an A-shaped frame 55, which, in turn, is articulated to the main body 48 and each actuators 54 is articulated to the A-shaped frame 55 and the main body 48.

The stability frame 8 is provided with supporting legs 56 and is displaced by the lifting cranes 6 and, for this purpose, is provided with two hooking members 57 mounted on the main body 48 for connection of the stability frame 8 to the lifting cranes 6 (FIG. 1).

Figure 8:
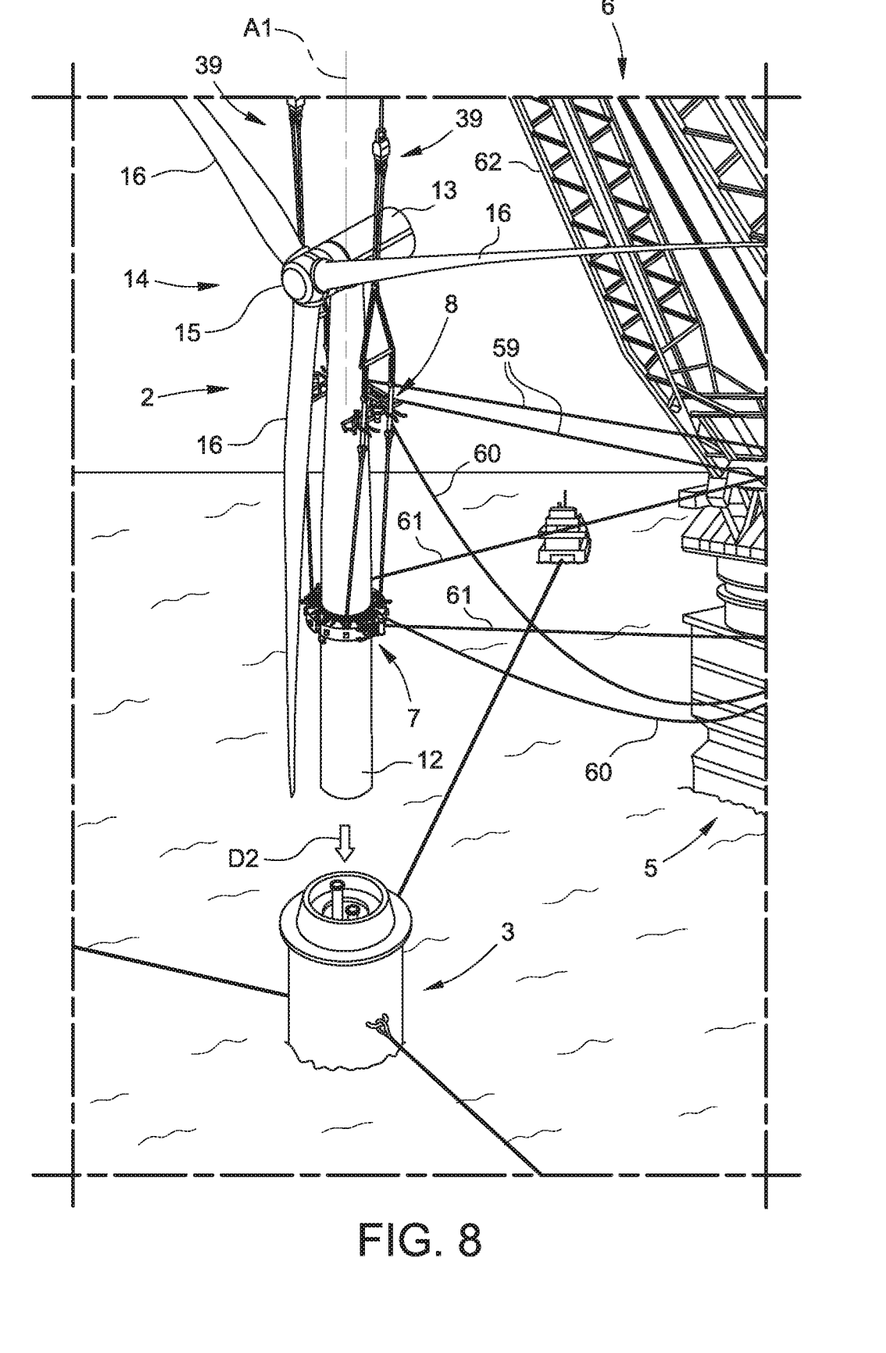
FIG. 8 is a perspective view, with parts removed for clarity, of a detail of the system of FIG. 1 before lowering a wind turbine on an offshore substructure.

The stability frame 8 comprises two attachments 58 for tugger lines 59 operated from winches (not shown), of the dual crane vessel 5 (FIG. 8).

The actuators 30, 33, 37 and 38 of the multi-functional clamp 7 (FIG. 4) and the actuators 54 of the stability frame 8 (FIG. 7) are hydraulic cylinders.

In use, the multi-functional clamp 7 and the stability frame 8 can be displaced by the lifting cranes 6 (FIG. 8) and the system 1 is configured to control the actuators 30, 33, 37 and 38 of the multi-functional clamp 7 (FIG. 4) and the actuators 54 of the stability frame 8 (FIG. 7) in any position they can assume during use.

With reference to FIG. 8, the system 1 is configured to control the multi-functional clamp 7 and the stability frame 8 from a remote position and for this purpose comprises a hydraulic circuit and a control system that, partly, extend along the stability frame 8, partly, along the multi-functional clamp 7 and, partly, on the crane vessel 5. In particular, the hydraulic circuit comprises a first portion located in the crane vessel 5; a second portion mounted on the multi-functional clamp 7, and a portion mounted on the stability frame 8; and umbilicals 60 configured to selectively connect the first portion to the second portion and the first portion to the third portion.

With reference to FIG. 8, the system 1 comprises further winches (not shown) on the crane vessel 5 configured to operate tugger lines 61 configured to be connected to the multi-functional clamp 7.

Figure 9:
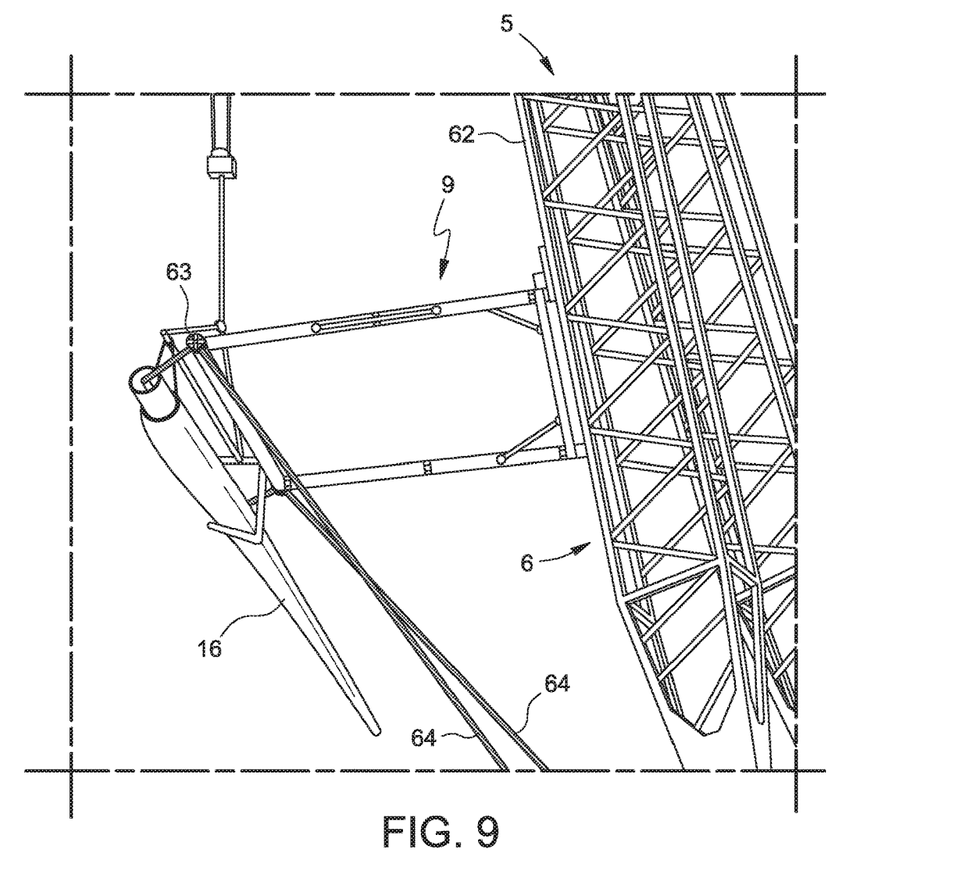
FIG. 9 is a perspective view, with part removed for clarity, of a further detail of the system of FIG. 1.

With reference to FIG. 9, the blade stability frame 9 is an extendable articulated frame, which is configured to be installed on a crane boom 62 configured to guide the rigging assembly 11 when lifting a blade 16 and configured to support sheaves 63 for tugger lines 64 for controlling the position of the blade 16 during installation of the same and controlled by winches (not shown) on the crane vessel 5.

Figure 10:
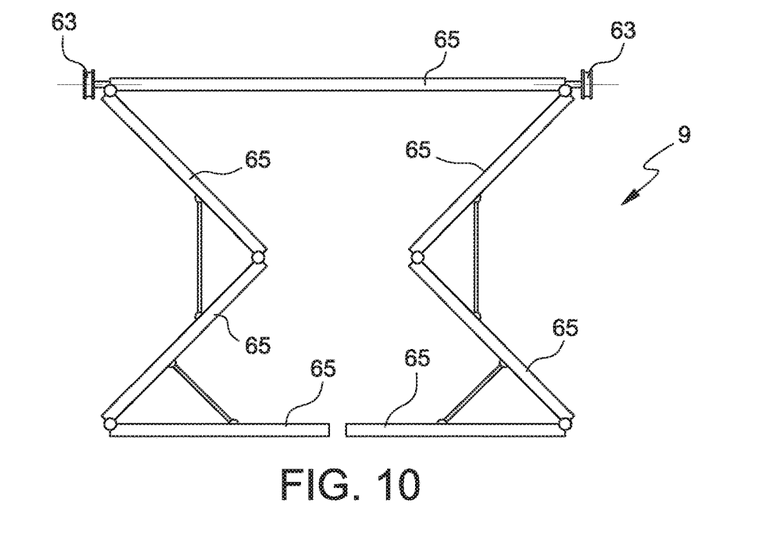
FIG. 10 is plan view, with part removed for clarity, of a detail of FIG. 9.

In FIG. 10, the blade stability frame 9 is shown in a partially contracted configuration. The blade stability frame 9 comprises hinged beams 65 (i.e., steel box sections connected by hinges), and a mechanism used to extend and retract the blade stability frame 9 comprising electric motors (not shown) configured to drive rack and pinion systems along a track on the box sections.

The blade stability frame 9 is mounted onto the crane boom 62 via clamps or padeyes (not shown) on the boom 62, by using the first lifting crane 6 at the boom rest and the second lifting crane 6 working, facilitating a rapid installation in to the lifting crane 6, removal for rapid reconfiguration of the lifting vessel 5.

In use and with reference to FIG. 1, the carrier vessel 18 transports a number of towers 12, subassemblies 17 and blades 16 from the onshore construction site 4 to the crane vessel 5 that is located in or in proximity of the offshore substructures 3.

The towers 12, subassemblies 17 and blades 16 are transferred from the carrier vessel 18 to the main deck 19 of the crane vessel 5 by a lifting crane 6 and one tower 12 is located on the deck extension module 10 by a lifting crane 6. The bottom end of the tower 12 rest in the pit 24 of the lower deck 21 and is clamped by the multi-functional clamp 7 which is supported by the upper deck 22 in axial alignment with the pit 24.

The lifting crane 6 release the tower 12 and lifts the subassembly 17 from the main deck 19 above the top end of the tower 12, and lowers the subassembly 17 atop the tower 12 for connection of the same.

The lifting crane 6 lifts one blade 16 from the main deck 19 to a blade connection flange of the hub 15.

The position of the blade 16 is controlled by the lifting crane 6 in combination with tugger lines 64 guided by the sheaves 63 mounted on the blade stability frame 9.

Once all the blades 16 are assembled to the hub 15, the wind turbine 2 is completed and can be installed on the offshore substructure 3.

The lifting crane 6 lifts the stability frame 8, which is brought about the tower 12 and is clamped to the tower 12 in proximity of the top of the same.

With reference to FIG. 6, the lifting crane 6 equipped with the rigging assembly 11 brings the hoisting lines 45 into the guides 50 of the stability frame 8 and the eyelet 46 at the hooking members 31 of the multi-functional clamp 7.

The hooking members 31 secured the eyelets 46 to the multi-functional clamp 7.

The lifting crane 6 lifts the wind turbine 2 and transfers the wind turbine to the offshore substructure 3. Once the wind turbines is assembled to the offshore substructure 3, actuators 38 unlock the multi-functional clamp 7, and actuators 37 open the multi-functional clamp 7.

Lifting crane 6 frees the hoisting lines 45 from the guides 50 of the stability frame 8 and brings the multi-functional clamp 7 on the upper deck 22 in the given or designated position and in the open configuration configured to receive one more tower 12.

The lifting cranes 6 are secured to the stability frame 8, which is, then, unclamped from the tower 12 of the installed wind turbine 2 and is brought on the top structure 23 of the deck extension module 10.

The present disclosure extends to additional variants which are not explicitly described and which fall within the scope of protection of the claims. That is, the present disclosure also covers embodiments that are not described in the detailed description above as well as equivalent embodiments that are part of the scope of protection set forth in the claims. Accordingly, various changes and modifications to the presently disclosed embodiments will be apparent to those skilled in the art.

The invention claimed is:

1. A multi-functional clamp comprising:
a main body configured to selectively clamp and unclamp a tower of a wind turbine installable on an offshore substructure, the main body shaped to couple with a crane vessel to define a designated position for the tower of the wind turbine with respect to the crane vessel; and
a plurality of hooking members extending from the main body, each hooking member configured to selectively secure and release a respective free end of a rigging assembly of a lifting crane of the crane vessel to the main body and each hooking member comprising two flanges defining respective aligned holes, a pin configured to be inserted into the aligned holes, and an actuator mounted on one of the two flanges.

2. The multi-functional clamp of claim 1, further comprising:
a plurality of jaws extending inwardly from the main body and configured to selectively clamp and unclamp the tower, and
a plurality of actuators configured to control the jaws.

3. The multi-functional clamp of claim 1, wherein the main body defines an annular shape and is configured to be opened to an open configuration and closed to a close configuration.

4. The multi-functional clamp of claim 1, wherein the main body comprises a first sector, a second sector and a third sector, the second sector and the third sector comprising respective first ends hinged to opposite ends of the first sector and respective second ends configured to be mutually and selectively locked to each other.

5. The multi-functional clamp of claim 4, wherein the first sector defines parallel holes configured to enable the coupling of the main body with the crane vessel to define the designated position.

6. A system comprising:
a crane vessel comprising a main deck and a lifting crane;
a multi-functional clamp comprising:
a main body configured to selectively clamp and unclamp a tower of a wind turbine installable on an offshore substructure, the main body shaped to couple with the crane vessel to define a designated position for the tower of the wind turbine with respect to the crane vessel, and
a plurality of hooking members extending from the main body, each hooking member configured to selectively secure and release a respective free end of a rigging assembly of the lifting crane of the crane vessel to the main body; and a deck extension module mounted to the crane vessel and configured to couple with the multi-functional clamp and support the tower of the wind turbine.

7. The system of claim 6, wherein the deck extension module comprises a lower deck defining a pit configured to constrain and support a bottom end of the tower of the wind turbine.

8. The system of claim 7, wherein the deck extension module comprises an upper deck configured to shape couple with the multi-functional clamp to hold the multi-functional clamp aligned with the pit.

9. The system of claim 7, wherein the multi-functional clamp defines a recess and the upper deck comprises a protrusion configured to mutually couple with the recess to define a position of the multi-functional clamp on the upper deck along a designated axis.

10. The system of claim 6, further comprising a stability frame configured to selectively clamp and unclamp an upper portion of the tower of the wind turbine.

11. The system of claim 10, wherein the deck extension module comprises a top structure configured to support the stability frame in a rest position.

12. The system of claim 10, wherein the rigging assembly comprises a plurality of hoisting lines configured to be secured to the multi-functional clamp and to be coupled to the stability frame in association with a lifting of the wind turbine.

13. A method for installation of a wind turbine on an offshore substructure, the method comprising:

clamping a tower of a wind turbine in an upright position by a multi-functional clamp comprising a main body configured to selectively clamp and unclamp the tower of the wind turbine, the main body shaped to couple with a crane vessel to define a designated position for the tower of the wind turbine with respect to the crane vessel, and a plurality of hooking members extending from the main body, each hooking member configured to selectively secure and release a respective free end of a rigging assembly of a lifting crane of the crane vessel to the main body;

assembling the wind turbine by the lifting crane of the crane vessel while the multi-functional clamp retains the tower of the wind turbine in the upright position;

constraining a part of the rigging assembly into a guide of a stability frame clamped to an upper part of the tower of the wind turbine;

lifting the wind turbine by anchoring the rigging assembly of the lifting crane to the multi-functional clamp; and lowering the wind turbine on the offshore substructure.

14. The method of claim 13, wherein constraining the part of the rigging assembly into the guide of the stability frame comprises:

controlling a first rigging of the rigging assembly by a first lifting crane of the crane vessel to insert a first part of the first rigging into the guide of the stability frame from a first side of the stability frame; and controlling a second rigging by a second lifting crane of the crane vessel to insert a second part of the second rigging into the guide of the stability frame from a second side of the stability frame.

15. The method of claim 13, further comprising arranging the tower of the wind turbine on a deck extension module mounted to the crane vessel.

16. The method of claim 15, further comprising:

arranging, by the lifting crane of the crane vessel, the tower of the wind turbine in a pit on a lower deck of the deck extension module; and clamping the tower of the wind turbine by the multi-functional clamp retained in alignment with the pit on an upper deck of the deck extension module.

17. The method of claim 16, further comprising selectively coupling the multi-functional clamp to the upper deck at a designated position for the multi-functional clamp along the upper deck.

18. The method of claim 13, further comprising supplying power to the multi-functional clamp and exchanging signals between the crane vessel and the multi-functional clamp by an umbilical connected to the multi-functional clamp and to the crane vessel.

19. The method of claim 13, further comprising controlling, by a tugger line controlled from the crane vessel, a position of the multi-functional clamp, when suspended to the lifting crane.

20. The method of claim 13, further comprising controlling, by a tugger line and a blade stability frame mounted on the lifting crane, a position of one blade of the wind turbine suspended to the lifting crane.

21. The method of claim 20, further comprising selectively extending the blade stability frame to an operative configuration and retracting the blade stability frame to a rest configuration.

22. The method of claim 13, wherein assembling the wind turbine by the lifting crane of the crane vessel comprises:

(i) lifting one subassembly comprising a nacelle and a hub on top of the tower of the wind turbine for a mounting of the subassembly atop the tower;

(ii) lifting one blade of a plurality of blades in a horizontal position to the hub for the mounting of the blade to the hub; and (iii) repeating (i) and (ii) for each of the other blades.

23. The method of claim 13, further comprising storing a plurality of towers, a plurality of subassemblies, and the plurality of blades on a main deck of the crane vessel.

24. The method of claim 23, further comprising:

transporting, by a transfer vessel, the plurality of towers, the plurality of subassemblies, and the plurality of blades from an onshore construction site to the crane vessel; and transferring, by one lifting crane of the crane vessel, the plurality of towers, the plurality of subassemblies, and the plurality of blades from the transfer vessel to the main deck.

* * * * *